(12) United States Patent　(10) Patent No.: US 9,100,805 B2
Oshita　(45) Date of Patent: Aug. 4, 2015

(54) PORTABLE ELECTRONIC DEVICE, COMMUNICATION SYSTEM, ANNOUNCEMENT CONTROLLING METHOD, AND STORAGE MEDIUM STORING PROGRAM

(71) Applicant: CASIO COMPUTER CO., LTD., Shibuya-ku, Tokyo (JP)

(72) Inventor: Yuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/094,335

(22) Filed: Dec. 2, 2013

(65) Prior Publication Data

US 2014/0171055 A1　Jun. 19, 2014

(30) Foreign Application Priority Data

Dec. 17, 2012　(JP) .................................. 2012-274785

(51) Int. Cl.
*H04W 24/00*　(2009.01)
*H04M 1/725*　(2006.01)
*H04W 4/12*　(2009.01)
*H04W 68/00*　(2009.01)
*H04W 4/00*　(2009.01)
*H04W 12/12*　(2009.01)
*G01C 22/00*　(2006.01)

(52) U.S. Cl.
CPC .............. *H04W 4/12* (2013.01); *H04M 1/7253* (2013.01); *H04M 1/72569* (2013.01); *H04W 4/008* (2013.01); *H04W 12/12* (2013.01); *H04W 68/00* (2013.01); *G01C 22/006* (2013.01); *H04M 2250/02* (2013.01)

(58) Field of Classification Search
CPC . H04W 24/00; H04W 88/02; H04M 1/72519; H04M 1/72516
USPC .......................... 455/41.2, 567, 456.4, 569.1
See application file for complete search history.

(56) References Cited

U.S. PATENT DOCUMENTS

| | | | |
|---|---|---|---|
| 8,006,002 B2 * | 8/2011 | Kalayjian et al. ................ | 710/36 |
| 2002/0115478 A1 * | 8/2002 | Fujisawa et al. .............. | 455/567 |
| 2005/0277452 A1 * | 12/2005 | Pasamba ..................... | 455/575.6 |
| 2009/0221275 A1 * | 9/2009 | Trip .............................. | 455/418 |

FOREIGN PATENT DOCUMENTS

| | | |
|---|---|---|
| JP | 2009-118403 A | 5/2009 |
| JP | 2009-118474 A | 5/2009 |

* cited by examiner

*Primary Examiner* — Marisol Figueroa
(74) *Attorney, Agent, or Firm* — Holtz, Holtz, Goodman & Chick PC

(57) ABSTRACT

A portable electronic device includes: a wireless communication unit that transmits and receives data to and from an external device via near field communication; a measuring unit that measures a physical quantity for determining a predetermined kinetic state of the portable electronic device; an announcement unit that issues a predetermined announcement; an announcement setting unit that makes a setting for whether to permit the announcement and/or for an announcement mode based on the kinetic state of the portable electronic device, which is determined based on the measurement by the measuring unit, and the kinetic state of the external device, which is acquired via the wireless communication unit; and an announcement controller that controls the announcement unit to issue the announcement based on the setting made by the announcement setting unit.

17 Claims, 12 Drawing Sheets

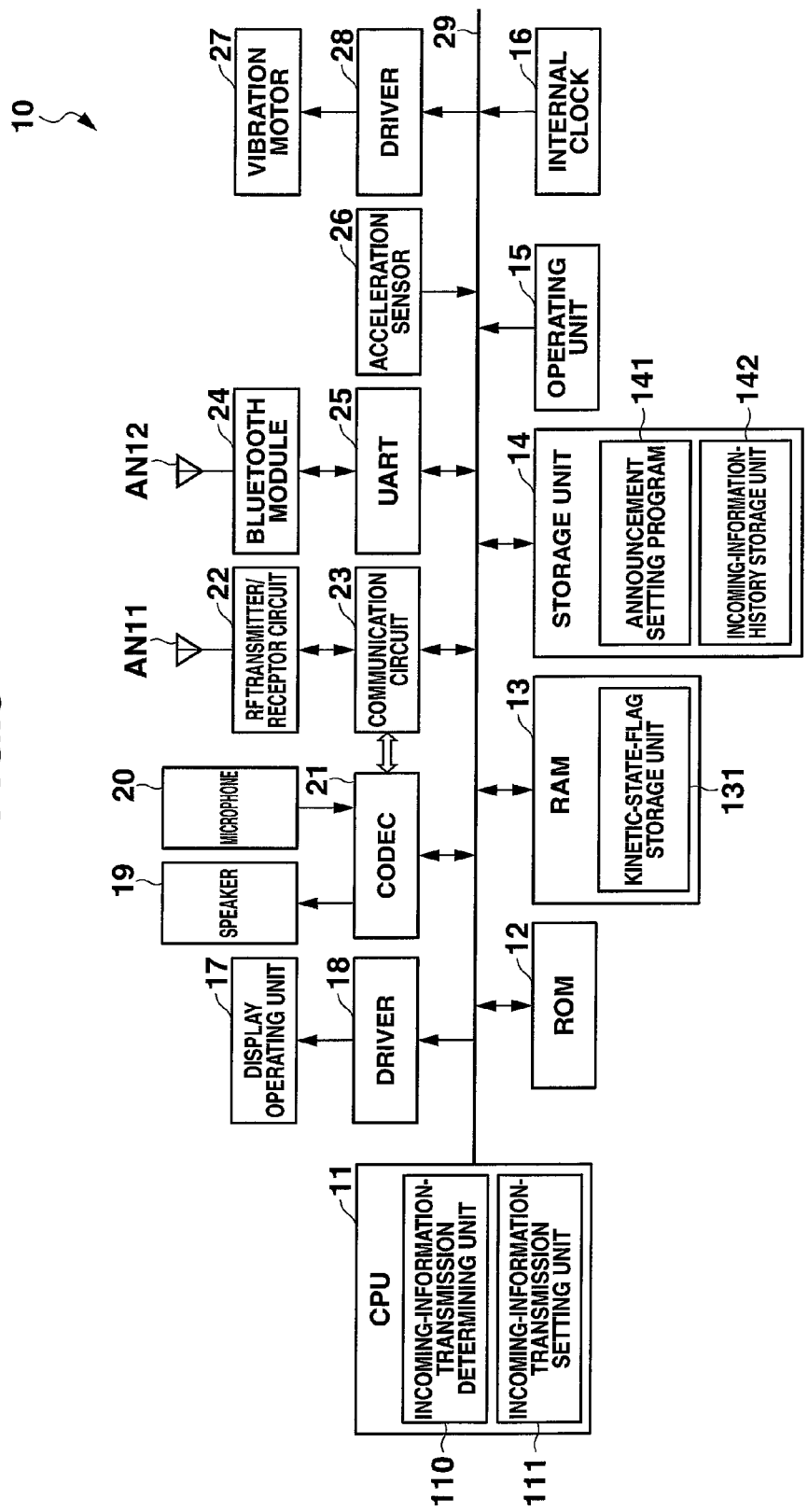

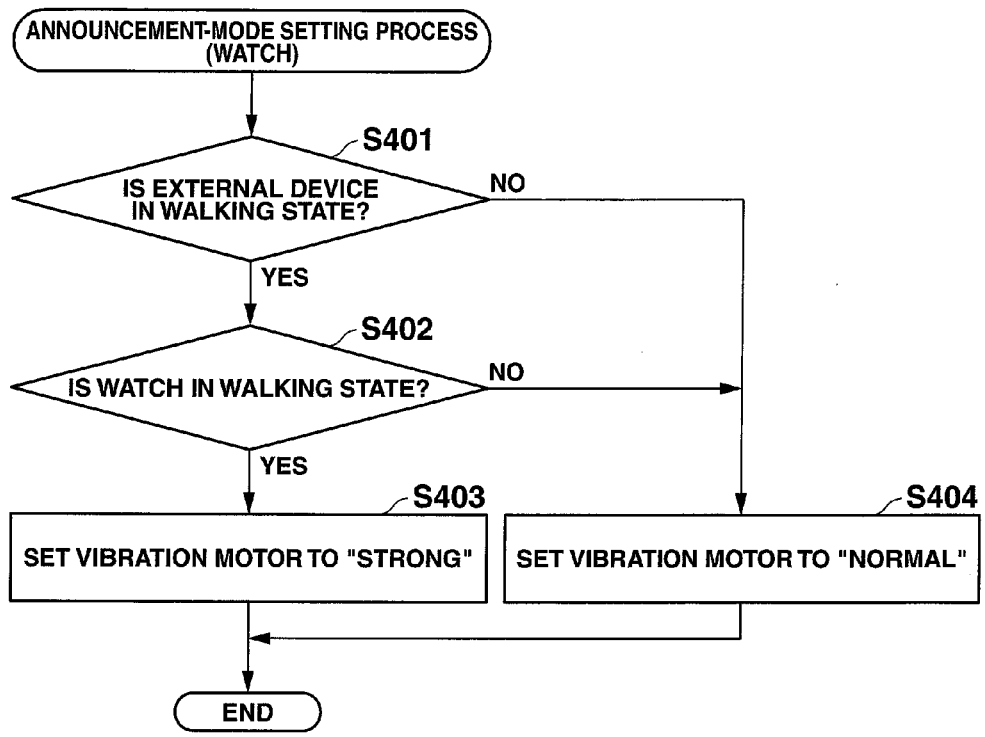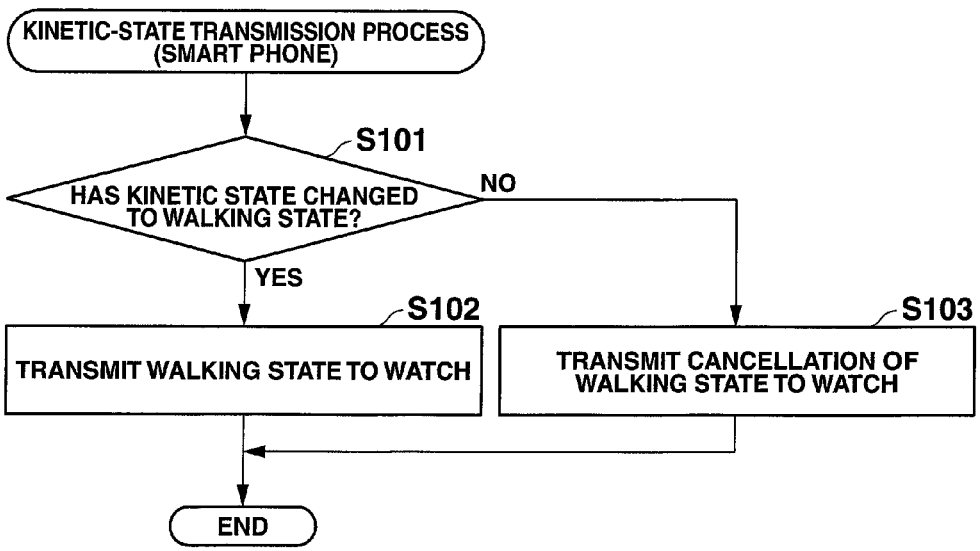

PORTABLE ELECTRONIC DEVICE, COMMUNICATION SYSTEM, ANNOUNCEMENT CONTROLLING METHOD, AND STORAGE MEDIUM STORING PROGRAM

BACKGROUND OF THE INVENTION

1. Field of the Invention

The present invention relates to a portable electronic device, a communication system, an announcement controlling method, and a storage medium storing a program.

2. Description of Related Art

Portable terminals and communication systems are known that can establish communication among the portable terminals via near field communication, such as a Bluetooth (trademark) scheme, and transmit/receive information at substantially real time, as required. The information associated with the portable terminals can be comprehensively controlled via near field communication, and various announcement actions can be intensively carried out through a single portable terminal.

The portable terminals in such a communication system may include electronic watches. An electronic watch can often be worn on a user's arm in a situation in which another portable terminal cannot be held in the user's hand. Electronic watches have been developed that can acquire information on incoming calls and e-mails received by other portable terminals, such as mobile phones and smart phones, and issue an announcement of the information, and can sound alarms set via smart phones. Japanese Unexamined Patent Application Publication No. 2009-118403 discloses a technology for the acquisition of time information from a mobile phone via near field communication and the correction of the time on an electronic watch.

Japanese Unexamined Patent Application Publication No. 2009-118474 describes an electronic watch that can remotely control the shutter of a camera on a mobile phone and automatically enter a control mode for the remote control of the shutter in response to a change in the mode of the mobile phone having the camera.

A conventional technique determines whether to permit announcements or switches an announcement mode for a single or multiple portable terminals in accordance with a setting(s) made by a user. Thus, every time the condition varies, the user has to change the setting. This requires complicated operation, issues inappropriate announcements, and/or causes the user to fail to recognize necessary announcements.

SUMMARY OF THE INVENTION

The present invention provides a portable electronic device, a communication system, an announcement controlling method, and a storage medium storing a program enabling users to readily and reliably acquire necessary information through an appropriate announcement while reducing the burden of users.

According to an aspect of the present invention, there is provided a portable electronic device including: a wireless communication unit that transmits and receives data to and from an external device via near field communication; a measuring unit that measures a physical quantity for determining a predetermined kinetic state of the portable electronic device; an announcement unit that issues a predetermined announcement; an announcement setting unit that makes a setting for whether to permit the announcement and/or for an announcement mode based on the kinetic state of the portable electronic device and a kinetic state of the external device, the kinetic state of the portable electronic device being determined based on the measurement by the measuring unit, the kinetic state of the external device being acquired via the wireless communication unit; and an announcement controller that controls the announcement unit to issue the announcement based on the setting made by the announcement setting unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a block diagram of the internal structure of a smart phone;

FIGS. 4A and 4B are flow charts illustrating the control procedures of setting processes associated with announcement modes;

DESCRIPTION OF THE PREFERRED EMBODIMENTS

Embodiments of the present invention will now be described with reference to the accompanying drawings.

Figure 1:
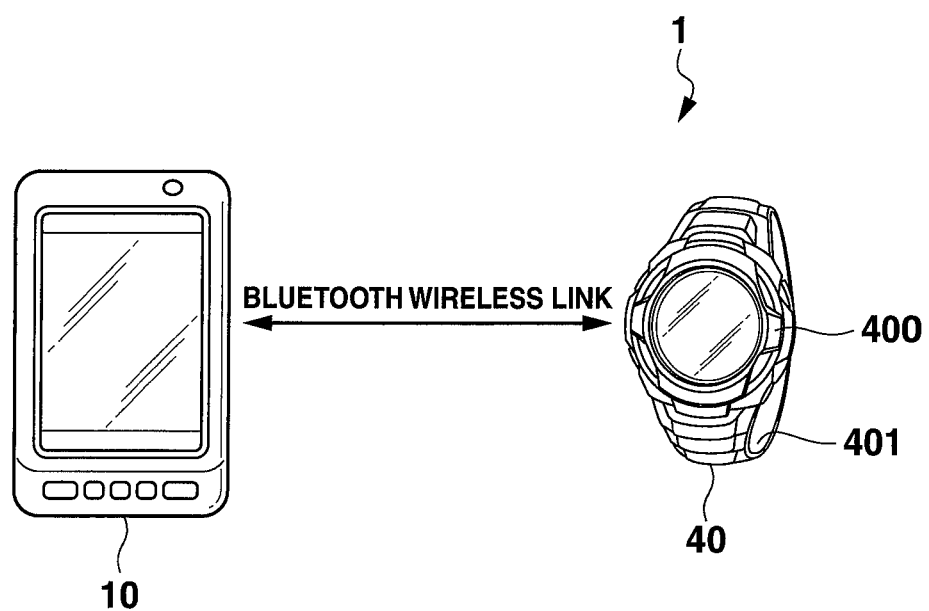
FIG. 1 is a schematic view of a communication system according to an embodiment of the present invention.

FIG. 1 illustrates a communication system 1 according to an embodiment of the present invention.

The communication system 1 includes an external device or smart phone 10, and a portable electronic device or electronic watch 40. The electronic watch 40 includes a watch body 400 and a band (attachment portion) 401. The electronic watch 40 can be attached to the arm of a user. The smart phone 10 is held in the hand, bag, or pocket of the user wearing the electronic watch 40. The electronic watch 40 and the smart phone 10 establish mutual communication via a near field communication scheme or Bluetooth scheme.

Figure 2:
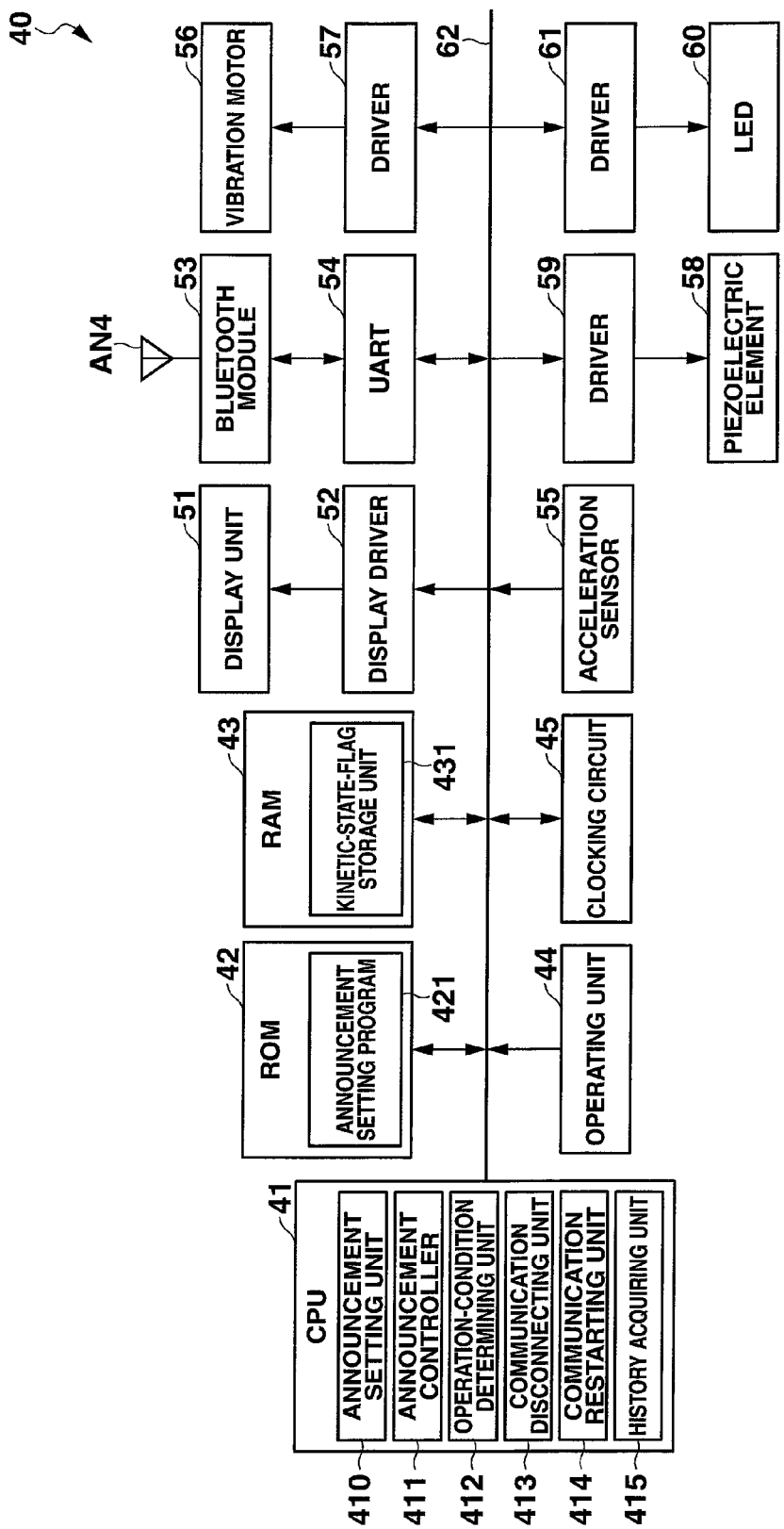
FIG. 2 is a block diagram of the internal structure of an electronic watch.

FIG. 2 is a block diagram of the internal structure of the electronic watch 40. FIG. 3 is a block diagram of the internal structure of the smart phone 10.

As illustrated in FIG. 2, the electronic watch 40 includes a central processing unit (CPU) 41 (an announcement setting unit 410, an announcement controller 411, an operation-condition determining unit 412, a communication disconnecting unit 413, a communication restarting unit 414, and a history acquiring unit 415); a read only memory (ROM) 42; a random access memory (RAM) 43; an operating unit 44; a clocking circuit 45; a display unit 51 and a display driver 52 that drives the display unit 51; an antenna AN4; a Bluetooth module 53 and a universal asynchronous receiver/transmitter (UART) 54, which are a wireless communication unit; a measuring unit or acceleration sensor 55; a vibration motor 56 and its driver 57; a piezoelectric element 58 and its driver 59; a light-emitting diode (LED) 60 and its driver 61; and a bus 62 with which signals are exchanged between the CPU 41 and the other components.

The CPU 41 comprehensively controls the operation of the electronic watch 40 and carries out various calculations. The CPU 41 displays the current time counted by the clocking circuit 45 on the display unit 51. The CPU 41 detects the kinetic state of the electronic watch 40 on the basis of the acceleration data acquired by the acceleration sensor 55. On the basis of the detected kinetic state of the electronic watch 40 and the kinetic state of the smart phone 10 acquired via the Bluetooth module 53, the CPU 41 can display images corresponding to predetermined information acquired by the smart phone 10 on the display unit 51 and issue announcements through the operation of the vibration motor 56, the piezoelectric element 58, and/or the LED 60. The CPU 41 displays images on the display unit 51 and/or operates the vibration motor 56, the piezoelectric element 58, and/or the LED 60 when satisfying a predetermined condition, such as the reception of information associated with events, the time of the electronic watch 40 matching the time set by an alarm, and events occurring at the smart phone 10, which are described below.

The ROM 42 stores various control programs to be executed by the CPU 41 and initial setting data. The control programs include an announcement setting program 421 associated with the announcement to be issued at communication terminals that communicate via the Bluetooth scheme, such as the smart phone 10.

The RAM 43 provides a work space for the CPU 41. The RAM 43 includes a kinetic-state-flag storage unit 431 for storing the kinetic state of the electronic watch 40 and the kinetic state of the smart phone 10 acquired via the Bluetooth scheme. These kinetic states are referred to for making a setting for announcements.

The operating unit 44 includes at least one push button. The operation of the push button by the user is converted to an electric signal, which is sent to a CPU 11, as an input signal. Alternatively, the operating unit 44 may be a touch panel shared with the digital display unit 51.

The clocking circuit 45 is a counter that counts and saves the current time. In the electronic watch 40, the current time is read and displayed on the display unit 51, and various operations are carried out by comparing the current time data with the set time data associated with various functions.

The display unit 51 includes a dot-matrix liquid crystal display (LCD), for example. The display driver 52 (liquid crystal driver) is operated in response to control signals from the CPU 41 and drives the LCD to display predetermined items, such as the current time, settings, and/or various functional menus. The display unit 51 may include another type of display, for example, organic electro-luminescent display (ELD). The display driver 52 is appropriately selected depending on the type of display.

The Bluetooth module 53 is a control module for the establishment of the Bluetooth communication with external devices via the antennal AN4. The Bluetooth module 53 may conform to a Bluetooth Low Energy standard. The data from the CPU 41 is sent to the UART 54, which performs serial-parallel conversion. The converted data is sent from the Bluetooth module 53 to the external devices. The data received from the external devices via the Bluetooth module 53 is sent to the UART 54, which performs serial-parallel conversion. The converted data is sent to the CPU 41.

The acceleration sensor 55 measures accelerations in three orthogonal directions. The acceleration sensor 55 detects gravitational acceleration in the direction of the gravity and determines the direction of gravity. The acceleration sensor 55 is preferably compact and lightweight and includes, for example, a piezoresistive element.

The vibration motor 56, the piezoelectric element 58, and the LED 60 issue announcements through vibration, buzzer sound, and light, respectively, and constitute an announcement unit together with the display unit 51. The control signals sent from the CPU 41 to the drivers 57, 59, and 61 are converted to voltage signals of sufficient levels for the operation of the vibration motor 56, the piezoelectric element 58, and the LED 60, respectively. The drivers 57, 59, and 61 of the electronic watch 40 according to this embodiment can respectively vary the output levels, i.e. the vibration strength of the vibration motor 56, the sound intensity of the piezoelectric element 58, and the light intensity of the LED 60 in accordance with the control signals from the CPU 41.

The CPU 41, the ROM 42, the RAM 43, the operating unit 44, the display unit 51, and the display driver 52 constitute a computer.

As illustrated in FIG. 3, the smart phone 10 includes a CPU 11 (an incoming-information-transmission determining unit 110 (transmission determining unit) and an incoming-information-transmission setting unit 111 (transmission setting unit)); a ROM 12; a RAM 13; a storage unit 14; an operating unit 15; an internal clock 16; a display operating unit 17 and its driver 18; a speaker 19; a microphone 20; a codec 21; an external communication unit or radio frequency (RF) transmitter/receptor circuit 22; an antenna AN11 for RF transmission and reception; a communication circuit 23; a Bluetooth module 24; a UART 25; an antenna AN12 for transmission and reception of the Bluetooth scheme; an acceleration sensor 26; a vibration motor 27 and its driver 28; and a bus 29 connecting the CPU 11 and the other components.

The CPU 11 comprehensively controls the operation of the smart phone 10 and carries out various calculations. The CPU 11 determines the kinetic state of the smart phone 10 on the basis of the values acquired by the acceleration sensor 26. Upon the detection of a change in the kinetic state or upon the request from the electronic watch 40, the CPU 11 sends control signals to the Bluetooth module 24, which sends the settings associated with the current kinetic state to the electronic watch 40.

The ROM 12 stores various control programs to be executed by the CPU 11 and initial setting data. The RAM 13 provides a work space for the CPU 11 and stores temporary data for work. The RAM 13 includes a kinetic-state-flag storage unit 131 for storing the kinetic state of the smart phone 10 and the kinetic state of the electronic watch 40 acquired via the Bluetooth scheme.

The storage unit 14 is a readable/writable non-volatile memory, such as a flash memory or an electrically erasable and programmable read only memory (EEPROM). The storage unit 14 stores, for example, various application programs to be executed by the smart phone 10, and various data and settings associated with various functions. The application programs include an announcement setting program 141 for making a setting for announcements between the smart phone 10 and the electronic watch 40 via the Bluetooth scheme. The storage unit 14 includes an incoming-information-history storage unit 142 that stores the data on audio phone calls and e-mails and the list of incoming calls/e-mails received by the smart phone 10.

The operating unit 15 includes at least one operating key, and sends signals corresponding to the operation carried out on the operating key by the user to the CPU 11.

The internal clock 16 counts and saves the current time. The CPU 11 reads the current time and displays it on the display operating unit 17. Various operations are carried out by comparing the current time data with the set time data associated with the various functions. The current time data of the internal clock 16 is corrected every time communication is established with a portable base station by the RF transmitter/receptor circuit 22.

The display operating unit 17 includes an LCD, for example. The driver 18 (liquid crystal driver) is operated by control signals from the CPU 11 and drives the LCD to display images associated with the various functions of the smart phone 10. The display operating unit 17 may include another type of display, for example, organic electro-luminescent display (ELD). The driver 18 is appropriately selected depending on the type of display. The display operating unit 17 includes a touch sensor. The display operating unit 17 displays a menu allowing a user to operate the LCD as a touch panel, detects the operation carried out on the LCD, converts the operation to electrical signals, and sends the signals to the CPU 11, under control by the CPU 11.

The speaker 19 converts electrical signals to audio signals on the basis of signals from the codec 21 and outputs sound. The microphone 20 detects acoustic waves, converts the detected acoustic waves to electrical signals, and outputs the electrical signals to the codec 21. The codec 21 decodes the compression-coded digital audio signals into analog signals and sends the analog signals to the speaker 19 while encoding audio signals acquired through the microphone 20 and sending the encoded signals to the CPU 11 and the communication circuit 23.

The smart phone 10 may include separate speakers, one for phone calls, and one for audio output. The smart phone 10 may be able to output audio to earphones.

The speaker 19 of the smart phone 10 according to this embodiment can output alarm sounds and melodies corresponding to the announcements made for the users. An alarm sound may be a beep output with a piezoelectric element provide in addition to the speaker 19.

The RF transmitter/receptor circuit 22 supports communication with portable base stations via the antenna AN11 for RF transmission and reception, such as telephone communication and packet communication of e-mails. The communication circuit 23 performs various types of processing on the data transmitted to and from the RF transmitter/receptor circuit 22 to deliver data between the CPU 11 and the codec 21.

The Bluetooth module 24 controls the Bluetooth communication with a portable electronic device, such as the electronic watch 40, via the antenna AN12. The data sent from the CPU 11 receives serial-parallel conversion at the UART 25 and is sent from the Bluetooth module 24 to a portable electronic device. The data received from a portable electronic device via the Bluetooth module 24 receives parallel-serial conversion at the UART 25 and is sent to the CPU 11.

The acceleration sensor 26 measures accelerations in three orthogonal directions. The acceleration sensor 26 detects gravitational acceleration in the direction of the gravity and determines the direction of gravity. The acceleration sensor 26 is preferably compact and lightweight and includes, for example, a piezoresistive element.

The vibration motor 27 generates vibration to issue an announcement to a user. Upon the reception of a control signal from the CPU 11, the driver 28 converts the control signal to a voltage signal at a level sufficient to operate the vibration motor 27.

The announcement setting process by the communication system 1 according to this embodiment will now be described.

The smart phone 10 and the electronic watch 40 in the communication system 1 according this embodiment continuously acquire acceleration data from the acceleration sensors 55 and 26 and determine the kinetic states of the smart phone 10 and the electronic watch 40. The kinetic states are determined on the basis of variation patterns of acceleration and represent the movement or non-movement of the user holding the smart phone 10 and the electronic watch 40. The smart phone 10 and the electronic watch 40 according to this embodiment each have three kinetic states: a walking state, a carried state, and a stationary state. In the carried state, for example, the smart phone 10 or the electronic watch 40 is held in the user's hand, attached to the user's arm, or placed inside a pocket of the user's clothes or a bag or backpack carried by the user while the user is not moving or using a transportation means, such as a car or train. In the stationary state, for example, the smart phone 10 or the electronic watch 40 is placed on a desk or charger or is left in a still bag.

The walking state is determined through the comparison of the detected pattern of change in acceleration with a known pattern of change in acceleration that is characteristic to a walking human. The detected pattern of change in acceleration is derived from the accelerations detected in the three directions coordinate-transformed on the basis of the gravity direction (vertical direction) and the moving direction on a horizontal plane. The known pattern of change in acceleration is the pattern of periodic change in acceleration in the vertical direction and the accompanying periodic change in acceleration in the moving direction and the direction orthogonal to both the moving direction and the vertical direction.

The electronic watch 40, which is worn on the arm and affected by the arm swing, and the smart phone 10, which is held inside a pocket or bag, have slightly different patterns of change in acceleration. Thus, a detected pattern may be compared with both patterns, and the settings may be changed depending on the product.

The kinetic state is determined to be the stationary state if acceleration components other than the gravitational acceleration component are not detected continuously. The kinetic state is determined to be the carried state if the detected pattern of acceleration is other than those for the walking state and the stationary state.

Even if not in the walking state, a state involving continuous detection of a large change in the acceleration due to the running or bicycle riding of the user may be regarded as a walking state.

The determined kinetic state is set with a walking-state flag and a carried-state flag. That is, setting any one of the flags indicates the walking state or the carried state, while resetting the flags indicates the stationary state.

A change in the kinetic state of the electronic watch 40 (or the smart phone 10) is reported to the smart phone 10 (or the electronic watch 40) via the Bluetooth communication. The transmission of the information on the current kinetic state of the smart phone 10 (or the electronic watch 40) is requested, as required.

The kinetic state of the smart phone 10 received by the electronic watch 40 is stored in the kinetic-state-flag storage unit 431, whereas the kinetic state of the electronic watch 40 received by the smart phone 10 is stored in the kinetic-state-flag storage unit 131. The electronic watch 40 and the smart phone 10 according to this embodiment read the information on the kinetic states from the kinetic-state-flag storage units 431 and 131, respectively, as required, and set and update settings for the announcements on the basis of the readout kinetic states.

Specific examples of making settings for whether to permit announcements and for an announcement mode will now be described. The examples are described below as independent processes. Some of the processes, however, may be performed in parallel where possible. Each example may be appropriately modified to allow parallel processes.

The change in the setting of the announcement mode for the announcement of an incoming call or e-mail received by the smart phone 10 issued in the electronic watch 40 will now be described.

FIG. 4A is a flow chart illustrating the control procedure of an announcement-mode setting process for the electronic watch 40. The announcement-mode setting process is initiated when the electronic watch 40 receives the information on the change in the kinetic state of the smart phone 10. Upon the start of the announcement-mode setting process, the CPU 41 determines whether the kinetic state of the external device or smart phone 10 is the walking state (Step S401).

If the external device is not in the walking state (specifically, the walking-state flag of the external device is in the reset state at the kinetic-state-flag storage unit 431) (NO in Step S401), the CPU 41 selects "normal" as the vibration strength of the vibration motor 56 (Step S404). The CPU 41 then ends the announcement-mode setting process.

Alternatively, if the CPU 41 determines that the walking-state flag is set as the kinetic state of the external device (YES in Step S401), the CPU 41 determines whether the kinetic state of the electronic watch 40 is the walking state (Step S402). If the CPU 41 determines that the kinetic state is not the walking state (NO in Step S402), the process of the CPU 41 goes to Step S404. If the CPU 41 determines that the kinetic state is the walking state (YES in Step S402), the CPU 41 selects "strong" as the vibration strength of the vibration motor 56 (Step S403). The CPU 41 then ends the announcement-mode setting process.

The announcement-mode setting process can be initiated upon the detection of a change in the kinetic state of the electronic watch 40. In such a case, the CPU 41 does not have to acquire the kinetic state of the smart phone 10 again from the smart phone 10 in Step S401 and may use the kinetic state stored in the kinetic-state-flag storage unit 431.

FIG. 4B is a flowchart illustrating the control procedure of a kinetic-state transmission process of the smart phone 10 upon a change in the kinetic state.

A change in the kinetic state of the smart phone 10 is determined by the mismatch between the kinetic-state flag stored in the kinetic-state-flag storage unit 131 and the current kinetic state determined on the basis of the value acquired by the acceleration sensor 26. Upon the detection of a change in the kinetic state of the smart phone 10, the kinetic-state transmission process is initiated, and the CPU 11 determines whether the kinetic state has changed to the walking state (Step S101). If the CPU 11 determines that the kinetic state has changed to the walking state (YES in Step S101), the CPU 11 sends a signal for setting the walking-state flag to the electronic watch 40 via the Bluetooth communication (Step S102). The CPU 11 updates the kinetic state stored in the kinetic-state-flag storage unit 131 and ends the kinetic-state transmission process.

If the CPU 11 determines that the kinetic state has not changed to the walking state (NO in Step S101), the CPU 11 sends a signal for resetting the walking-state flag to the electronic watch 40 via the Bluetooth communication (Step S103). The CPU 11 updates the kinetic state stored in the kinetic-state-flag storage unit 131 and ends the kinetic-state transmission process.

In Step S101, "NO" is selected if the kinetic state changes between the carried state and the stationary state. In such a case, the walking-state flag is not set from the beginning and remains in the reset condition. Alternatively, the CPU 41 may determine the kinetic state again, and the information may not be sent to the electronic watch 40 via the Bluetooth communication.

The setting operation associated with an announcement for incoming calls and/or e-mails received by the smart phone 10 issued by the electronic watch 40 will now be described.

Figure 5A:
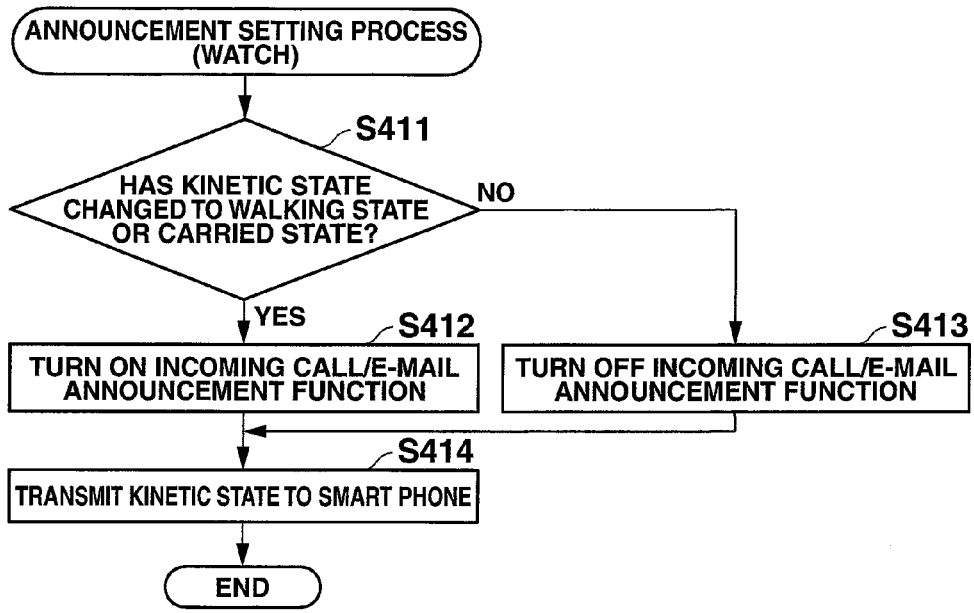
FIGS. 5A and 5B are flow charts illustrating the control procedures of announcement setting processes.

FIG. 5A is a flow chart illustrating the announcement setting process carried out by the CPU 41 of the electronic watch 40.

The announcement setting process is started upon the detection of a change in the kinetic state of the electronic watch 40. Upon the start of the announcement setting process at the electronic watch 40, the CPU 41 determines whether the kinetic state of the electronic watch 40 has changed to the walking state or the carried state (Step S411). Specifically, the CPU 41 determines the kinetic state on the basis of whether the walking-state flag or the carried-state flag is set. If the CPU 41 determines that the kinetic state has changed to the walking state or the carried state (YES in Step S411), the CPU 41 turns on the announcement function of incoming calls/e-mails received by the smart phone 10 (Step S412). The process of the CPU 41 then goes to Step S414.

If the CPU 41 determines that the kinetic state has not changed to the walking state or the carried state (i.e., determines that the kinetic state has changed to the stationary state) (NO in Step S411), the CPU 41 turns off the announcement function of incoming calls/e-mails received by the smart phone 10 (Step S413). The process of the CPU 41 then goes to Step S414.

In Step S414, the CPU 41 sends the updated kinetic state to the smart phone 10 (Step S414). The CPU 41 then ends the announcement setting process.

Figure 5B:
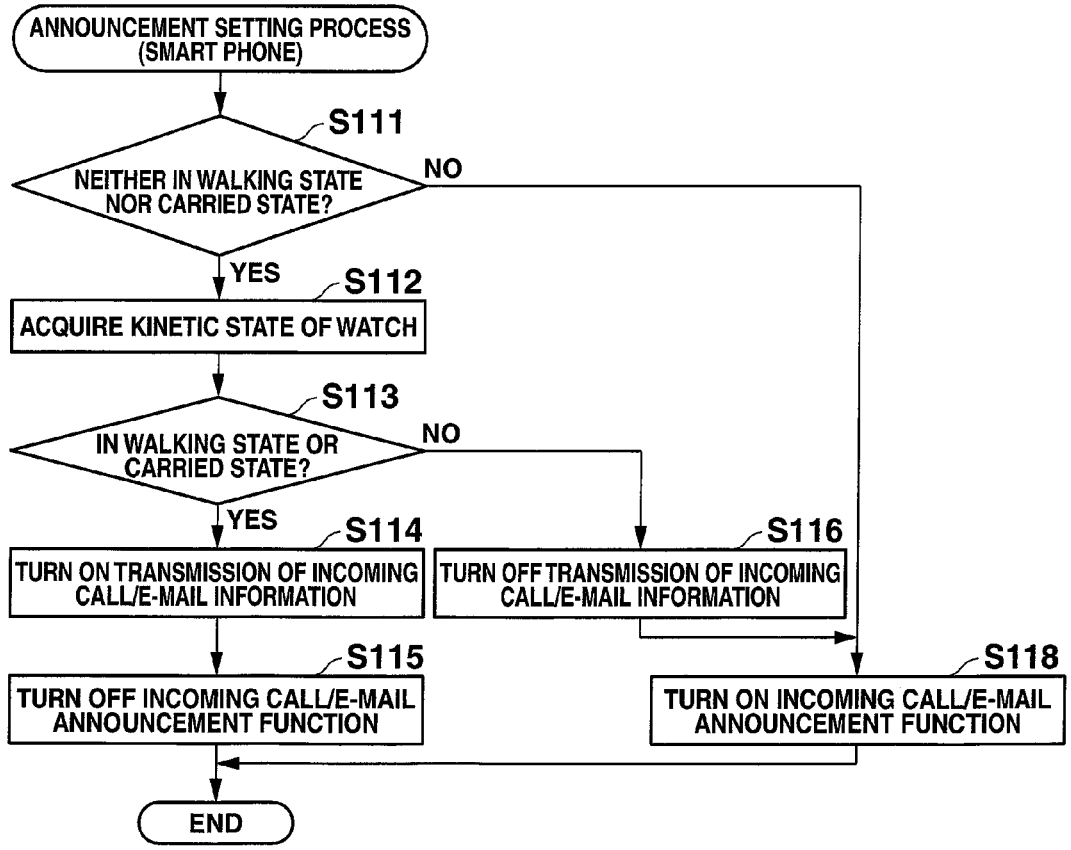

FIG. 5B is a flow chart illustrating the announcement setting process by the CPU 11 of the smart phone 10.

The announcement setting process is initiated upon the detection of a change in the kinetic state of the smart phone 10 on the basis of the data acquired by the acceleration sensor 26 or upon the reception of the information on the change in the kinetic state of the electronic watch 40. Upon the start of the announcement setting process, the CPU 11 determines whether the kinetic state of the smart phone 10 is neither the walking state nor the carried state (i.e., is in the stationary state) (Step S111). If the CPU 11 determines that the kinetic state is the walking state or the carried state (NO in Step S111), the process of the CPU 11 goes to Step S118.

Alternatively, if the CPU 11 determines that the kinetic state is neither the walking state nor the carried state (YES in Step S111), the CPU 11 acquires the kinetic state of the electronic watch 40 by referring to the kinetic-state-flag storage unit 131 (Step S112). The CPU 11 determines whether the kinetic state of the electronic watch 40 is the walking state or the carried state (Step S113). If the CPU 11 determines that the kinetic state is neither the walking state nor the carried state (NO in Step S113), the CPU 11 turns off the transmission of the information on the incoming calls/e-mails to the electronic watch 40 (Step S116). The process then goes to Step S118.

In Step S118, the CPU 11 turns on the announcement function of incoming calls/e-mails received by the smart phone 10. The CPU 11 then ends the announcement setting process.

In Step S113, if the CPU 11 determines that the kinetic state of the electronic watch 40 is the walking state or the carried state (YES in Step S113), the CPU 11 turns on the transmission of the information on incoming calls/e-mails to the electronic watch 40 (Step S114) and turns off the announcement function of incoming calls/e-mails of the smart phone 10 (Step S115). The CPU 11 then ends the announcement setting process.

In the announcement setting process according to this embodiment, as described above, the electronic watch 40 and the smart phone 10 do not issue announcements for incoming calls/e-mails received by the smart phone 10 if they are in the stationary state. If both the smart phone 10 and the electronic watch 40 are in the stationary state, the smart phone 10, which has received an incoming call/e-mail, issues an announcement.

Figure 6:
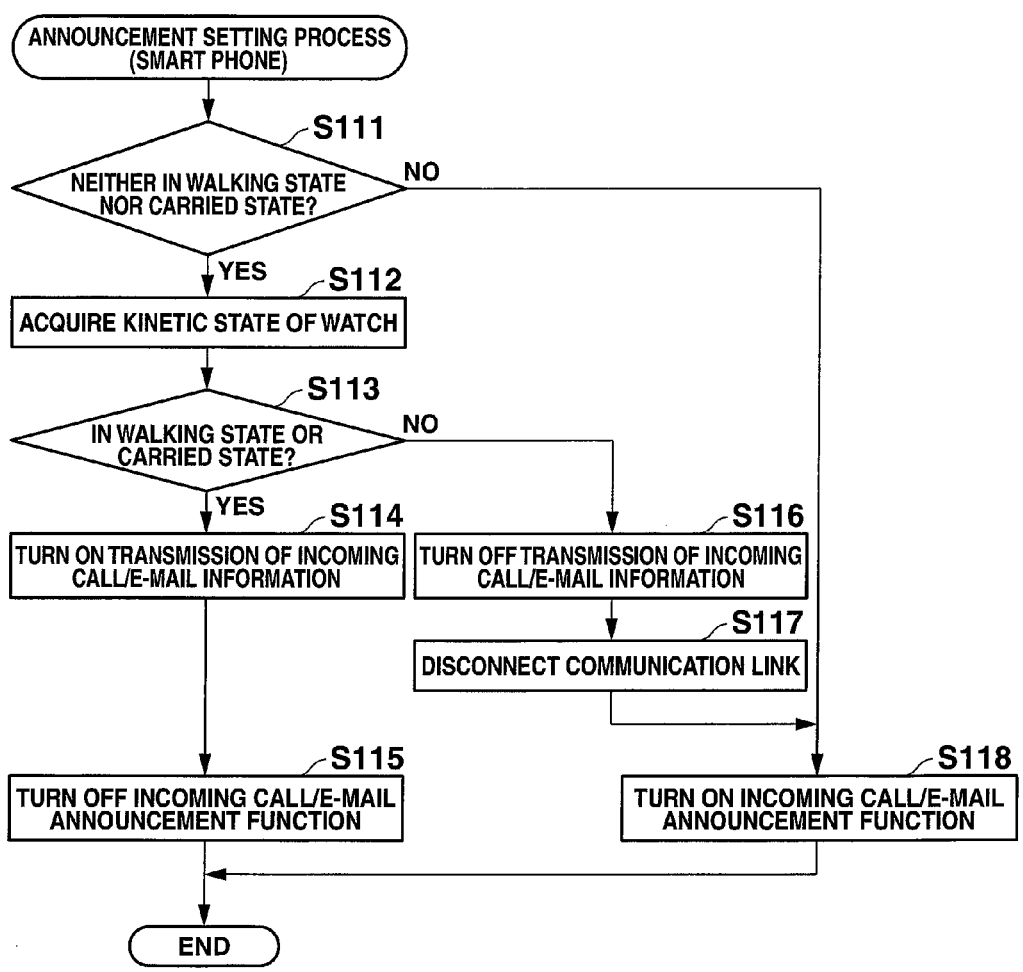
FIG. 6 is a flow chart illustrating a modified example of the control procedure of an announcement setting process.

FIG. 6 is a flow chart illustrating a modified example of the control procedure of an announcement setting process carried out by the CPU 11 of the smart phone 10.

The flow chart of the modified process is the same as the flow chart in FIG. 5B except that Step S117 intervenes between Step S116 and Step S118. Thus, the same steps will be designated by the same reference numerals without redundant description.

In this modified announcement setting process, the transmission of the information on the incoming calls/e-mails received by the smart phone 10 is turned off in Step S116, and the CPU 11 disconnects the Bluetooth communication between the smart phone 10 and the electronic watch 40 (Step S117). That is, if the smart phone 10 and the electronic watch 40 are both in the stationary state, the CPU 11 determines them as not being in use and terminates the Bluetooth communication. Specifically, the CPU 11 sends a control signal to the Bluetooth module 24 to disconnect the Bluetooth communication.

Upon the disconnection, the CPU 11 stores the communication history, including the time of disconnection, in the storage unit 14.

If the Bluetooth communication is terminated in the modified announcement setting process, the Bluetooth communication is reestablished subsequently.

Figure 7A:
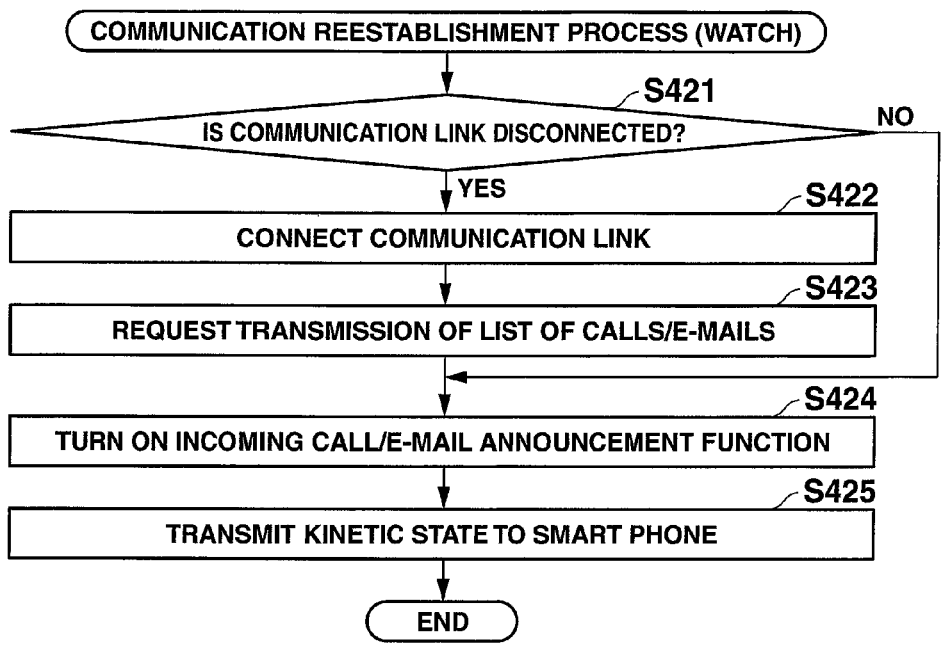
FIGS. 7A, 7B, and 7C are flow charts illustrating the control procedures of the reestablishment of communication.

FIG. 7A illustrates the control procedure of a communication reestablishment process of the CPU 41 to reestablish the Bluetooth communication of the electronic watch 40. The communication reestablishment process is initiated upon the change in the kinetic state of the electronic watch 40 from the stationary state to another state determined on the basis of the data acquired by the acceleration sensor 55.

Upon the start of the communication reestablishment process, the CPU 41 determines whether the communication is disconnected (Step S421). If the CPU 41 determines that the communication is not disconnected (NO in Step S421), the process of the CPU 41 goes to Step S424.

If the CPU 41 determines that the communication is disconnected (YES in Step S421), the CPU 41 sends a control signal to the Bluetooth module 24 to establish the Bluetooth communication (Step S422). If the Bluetooth communication is established between the electronic watch 40 and the smart phone 10, the CPU 41 sends a request to the smart phone 10 for the transmission of a list of calls/e-mails received by the smart phone 10 during the disconnection of the Bluetooth communication (Step S423). The process of the CPU 41 then goes to Step S424.

In Step S424 subsequent to Step S421 or S423, the CPU 41 turns on the announcement function of incoming calls/e-mails received by the smart phone 10 (Step S424). The CPU 41 sends the current kinetic state of the electronic watch 40 to the smart phone 10 (Step S425).

If the list of received calls/e-mails is not empty at this time, i.e., if the smart phone 10 has received at least one incoming call/e-mail during the disconnection, the CPU 41 issues an announcement in the same manner as that for the normal reception of a call/e-mail. In parallel with this announcement, the CPU 41 can output a control signal to the display driver 52 to display the list of received calls/e-mails in the displayable area of the display unit 51 as predetermined information on the received calls/e-mails and display the number of incoming calls/e-mails.

The CPU 41 then ends the communication reestablishment process.

Figure 7B:
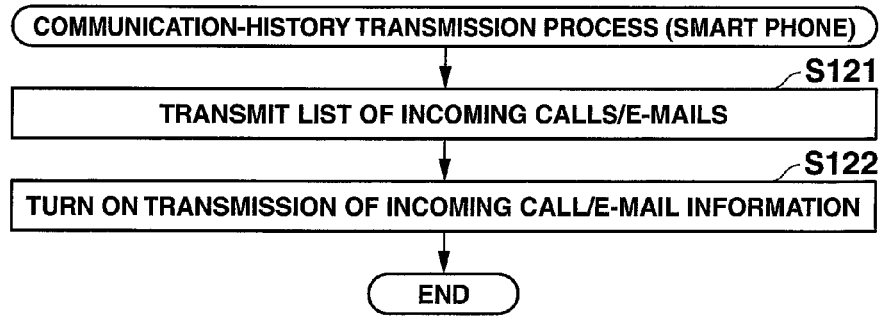

FIG. 7B is a flow chart illustrating the control procedure of a communication-history transmission process carried out by the CPU 11 of the smart phone 10 in response to a transmission request for the list of calls/e-mails sent to the smart phone 10. The transmission request is made in Step S423 of the communication reestablishment process carried out in the electronic watch 40.

Upon start of the communication-history transmission process, the CPU 11 refers to the incoming-information-history storage unit 142 and sends, to the electronic watch 40, the list of calls/e-mails received during the time of disconnection of the Bluetooth communication (Step S121). The CPU 11 turns on the transmission of the information on calls and/or e-mails received by the smart phone 10 to the electronic watch 40 (Step S122). The CPU 11 then ends the communication-history transmission process.

Figure 7C:
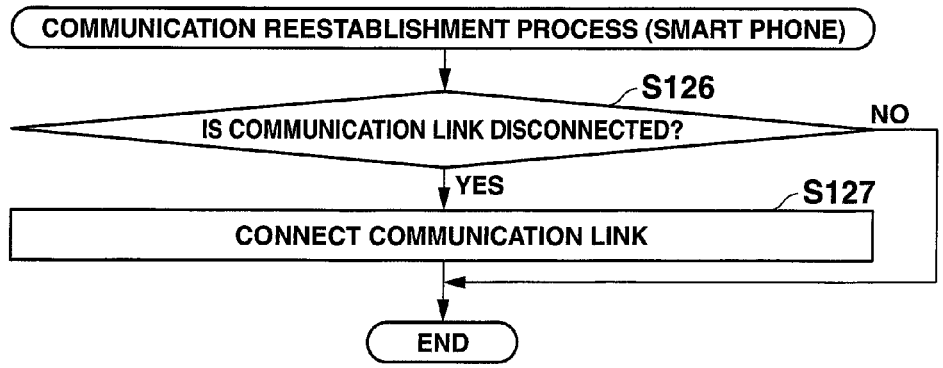

FIG. 7C is a flow chart illustrating the control procedure of a communication reestablishment process carried out by the CPU 11 to reestablish the Bluetooth communication of the smart phone 10. The communication reestablishment process is initiated upon the detection of a change in the kinetic state of the smart phone 10 from the stationary state to another state on the basis of the data acquired by the acceleration sensor 26 in the smart phone 10.

Upon the start of the communication reestablishment process, the CPU 11 determines whether the Bluetooth communication with the electronic watch 40 is disconnected (Step S126). If the CPU 11 determines that the Bluetooth communication is not disconnected (NO in Step S126), the CPU 11 ends the communication reestablishment process. If the CPU 11 determines that the Bluetooth communication is disconnected (YES in Step S126), the CPU 11 sends a control signal to the Bluetooth module 24 and establishes communication with the electronic watch 40 (Step S127). The CPU 11 then ends the communication reestablishment process.

A warning process for the detection and announcement of a misplaced smart phone 10 or electronic watch 40 will now be described.

Figure 8A:
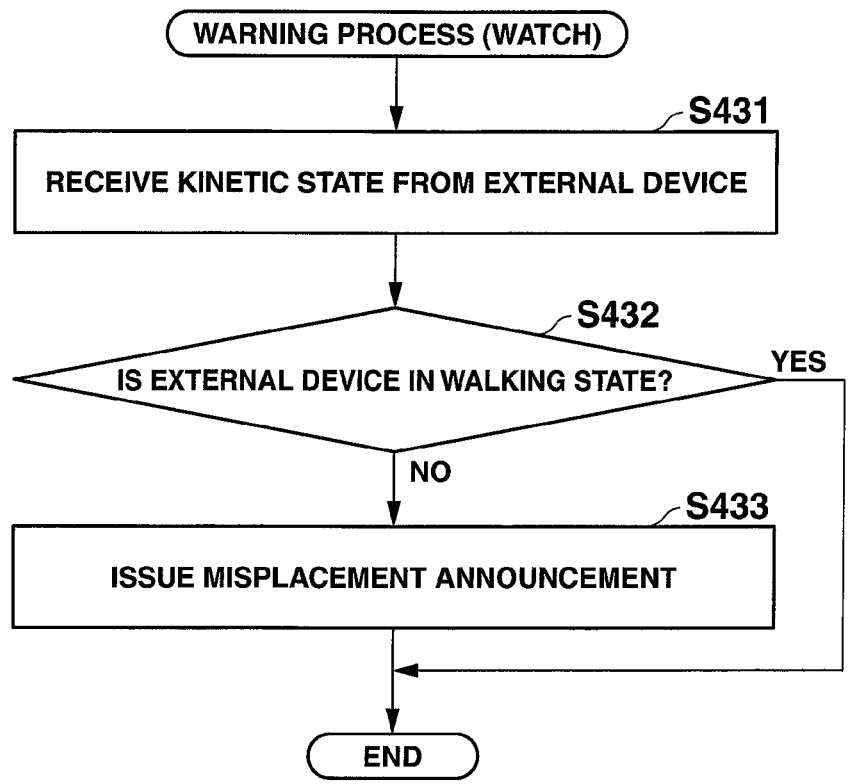
FIGS. 8A and 8B are flow charts illustrating the control procedures of warning processes.

FIG. 8A is a flowchart illustrating the control procedure of a warning process in the electronic watch 40.

The warning process is initiated upon the detection of a change to the walking state of the electronic watch 40. Upon the initiation of the warning process, the CPU 41 sends a request of transmission of the current kinetic state of an external device (smart phone 10) and receives the kinetic state of the smart phone 10 (Step S431).

The CPU 41 determines whether the current kinetic state of the smart phone 10 is the walking state (Step S432). If the CPU 41 determines that the kinetic state of the smart phone 10 is the walking state (YES in Step S432), the CPU 41 ends the warning process. If the CPU 41 determines that the kinetic state of the smart phone 10 is not the walking state (NO in Step S432), the CPU 41 sends a control signal(s) to at least one of the drivers 57, 59, and 61 to activate at least one of the vibration motor 56, piezoelectric element 58, and LED 60 and issues an announcement to the user for the misplacement of the smart phone 10 (Step S433). The announcement for the misplacement may be canceled in a predetermined time or may continue until the user manually inputs a cancellation command. Upon the cancellation of the announcement of the misplacement, the CPU 41 ends the warning process.

There might be a slight difference between the timing of the change in the kinetic state of the electronic watch 40 worn by a user to the walking state and the timing of the change in the kinetic state of the smart phone 10 placed inside a bag carried by the user to the walking state. Thus, the initiation of the warning process may be a predetermined time delayed from the timing when the electronic watch 40 changes to the walking state.

Figure 8B:
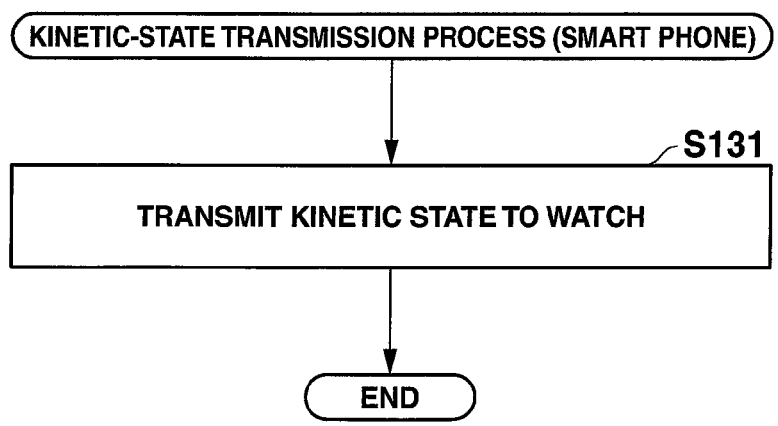

FIG. 8B is a flow chart illustrating a kinetic-state transmission process to transmit the kinetic state carried out by the smart phone 10.

Upon reception of a transmission request of the kinetic state from the electronic watch 40 at the smart phone 10, the CPU 11 initiates the kinetic-state transmission process, determines the current kinetic state on the basis of the data acquired by the acceleration sensor 26, and transmits the kinetic state to the electronic watch 40 (Step S131). The CPU 11 then ends the kinetic-state transmission process.

The request from the electronic watch 40 to the smart phone 10 for the transmission of the kinetic state may contain a signal for the confirmation of misplacement. In this way, if the kinetic state sent from the smart phone 10 to the electronic watch 40 is not the walking state, the CPU 11 can issue an announcement for misplacement at the smart phone 10.

Figure 9A:
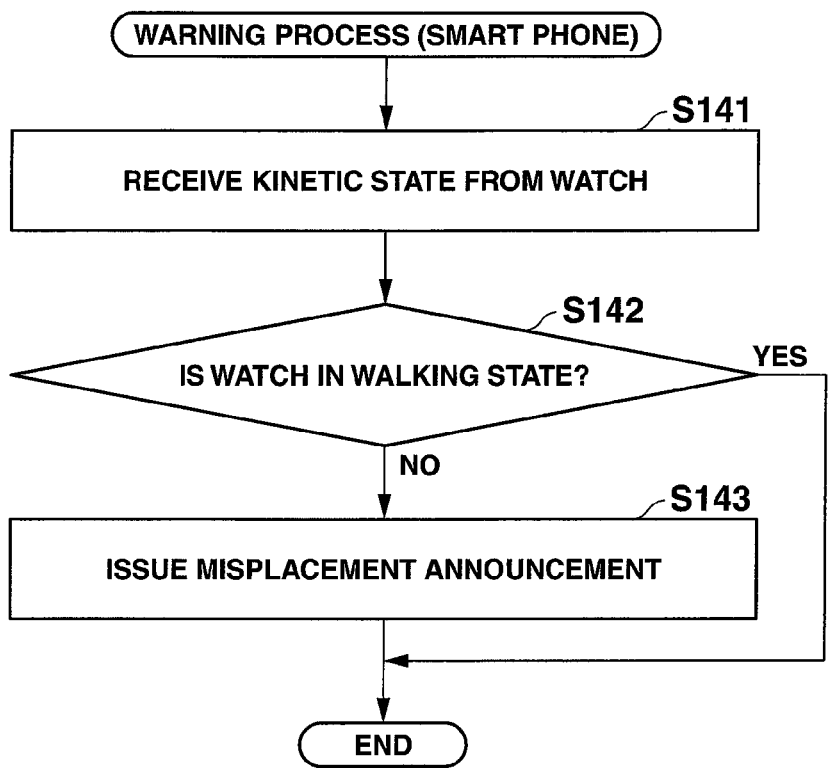
FIGS. 9A and 9B are flow charts illustrating the control procedures of warning processes.

FIG. 9A is a flow chart illustrating the control procedure of a warning process in the smart phone 10.

The warning process is initiated upon a change in the kinetic state of the smart phone 10 to the walking state, which is similar to the warning process in the electronic watch 40 as illustrated in FIG. 8A. Upon the start of the warning process, the CPU 11 sends a request for transmission of the current kinetic state to the electronic watch 40 and receives the kinetic state of the electronic watch 40 (Step S141).

The CPU 11 determines whether the updated kinetic state of the electronic watch 40 is the walking state (Step S142). If the CPU 11 determines that the kinetic state is the walking state (YES in Step S142), the CPU 11 ends the warning process. If the CPU 11 determines that the kinetic state is not the walking state (NO in Step S142), the CPU 11 sends a control signal(s) to at least one of the drivers 18 and 28 and the codec 21 and operates at least one of the display operating unit 17, speaker 19, and vibration motor 27 to issue an announcement for misplacement of the electronic watch 40 to a user (Step S143). Upon completion of the announcement for misplacement, the CPU 11 ends the warning process.

Figure 9B:
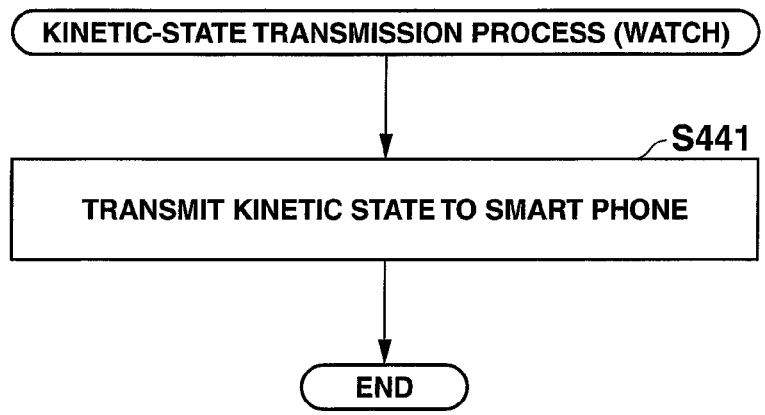

FIG. 9B illustrates the kinetic-state transmission process in the electronic watch 40.

When the electronic watch 40 receives, from the smart phone 10, a request for the transmission of the kinetic state, the CPU 41 initiates the kinetic-state transmission process, determines the current kinetic state of the electronic watch 40 on the basis of the data acquired by the acceleration sensor 55, and transmits the kinetic state to the smart phone 10 (Step S441). The CPU 41 then ends the kinetic-state transmission process. If the CPU 41 determines that the kinetic state is not the walking state, the CPU 41 may send a control signal(s) to at least one of the display driver 52 and the drivers 57, 59, and 61 to issue a predetermined announcement.

The process associated with a theft warning issued when there is a possibility that the smart phone 10 and/or the electronic watch 40 has been stolen will now be described.

Figure 10A:
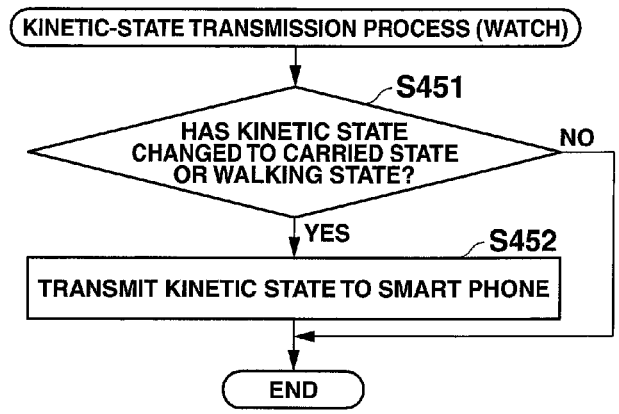
FIGS. 10A and 10B are flow charts illustrating the control procedures of theft warning processes.

FIG. 10A is a flow chart illustrating the control procedure of a kinetic-state transmission process carried out by the CPU 41 of the electronic watch 40.

The kinetic-state transmission process is initiated in response to a change in the kinetic state of the electronic watch 40 determined on the basis of the data acquired by the acceleration sensor 55.

Upon the start of the kinetic-state transmission process, the CPU 41 determines whether the kinetic state of the electronic watch 40 has changed to the carried state or the walking state (Step S451). If the CPU 41 determines that the kinetic state is neither the carried state nor the walking state (i.e., determines that the kinetic state is the stationary state) (NO in Step S451), the CPU 41 ends the kinetic-state transmission process.

If the CPU 41 determines that the kinetic state has changed to the carried state or the walking state (YES in Step S451), the CPU 41 sends the updated kinetic state to the smart phone 10 (Step S452). The CPU 41 then ends the kinetic-state transmission process.

Figure 10B:
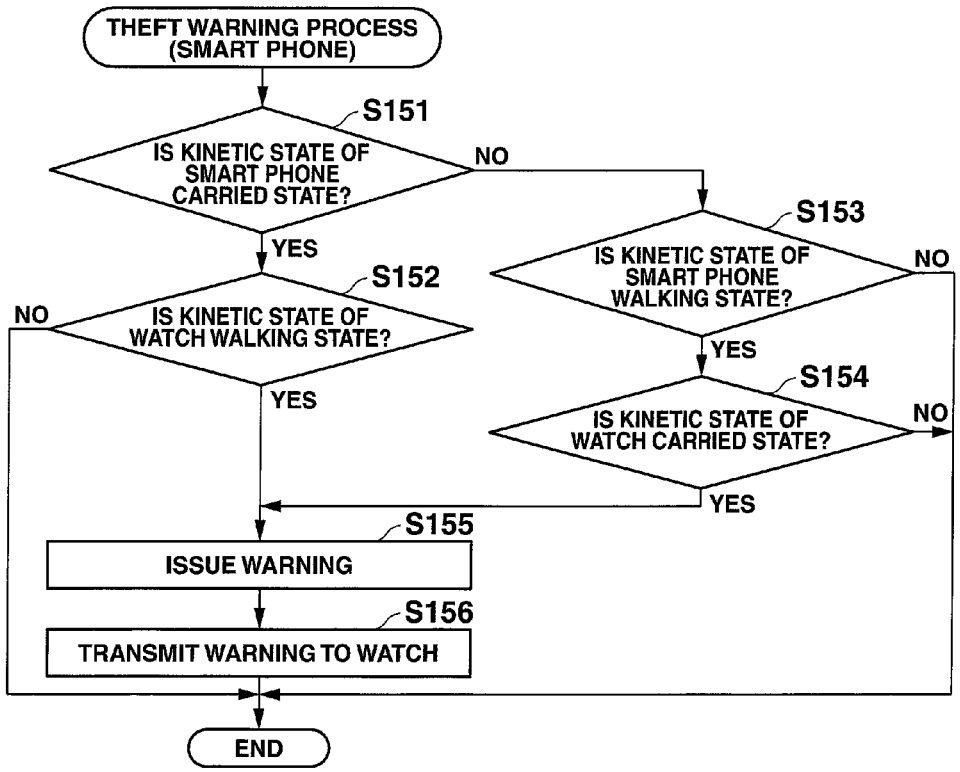

FIG. 10B is a flow chart illustrating the control procedure of a theft warning process carried out by the CPU 11 of the smart phone 10.

The theft warning process is initiated when the smart phone 10 receives the kinetic state sent from the electronic watch 40 in Step S452 of the kinetic-state transmission process.

Upon the start of the theft warning process, the CPU 11 determines whether the kinetic state of the smart phone 10 is the carried state (Step S151). If the CPU 11 determines that the kinetic state is the carried state (YES in Step S151), the CPU 11 determines whether the updated kinetic state of the electronic watch 40 is the walking state (Step S152).

If the CPU 11 determines that the kinetic state is not the walking state (NO in Step S152), the CPU 11 ends the theft warning process. If the CPU 11 determines that the kinetic state is the walking state (YES in Step S152), the CPU 11 sends a control signal(s) to at least one of the drivers 18 and 28 and the codec 21 and operates at least one of the display operating unit 17, vibration motor 27, and speaker 19 to issue a warning (Step S155). The CPU 11 sends a warning signal to the electronic watch 40 (Step S156). The CPU 11 then ends the theft warning process.

If the CPU 11 determines that the kinetic state of the smart phone 10 is not the carried state in Step S151 (NO in Step S151), the CPU 11 determines whether the kinetic state of the smart phone 10 is the walking state (Step S153). If the CPU 11 determines that the kinetic state is not the walking state (NO in Step S153), the CPU 11 ends the theft warning process.

If the CPU 11 determines that the kinetic state is the walking state (YES in Step S153), the CPU 11 determines whether the updated kinetic state of the electronic watch 40 is the carried state (Step S154). If the CPU 11 determines that the kinetic state is not the carried state (NO in Step S154), the CPU 11 ends the theft warning process.

If the CPU 11 determines that the kinetic state is the carried state (YES in Step S154), the process of the CPU 11 goes to Step S155, and the CPU 11 issues a warning and sends warning information to the electronic watch 40 (Step S156).

Figure 11A:
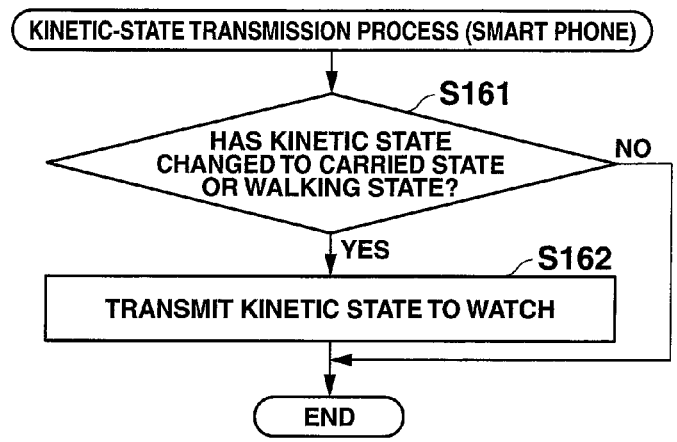
FIGS. 11A and 11B are flow charts illustrating the control procedures of theft warning processes.
Figure 11B:
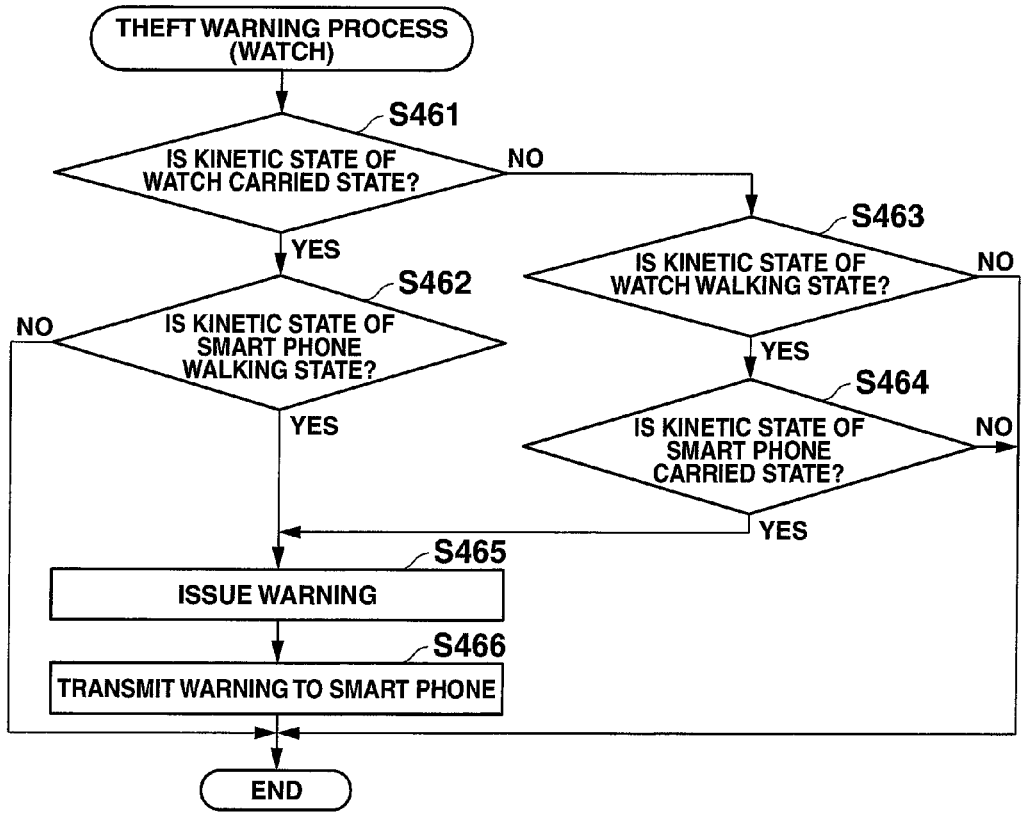

In contrast to FIG. 10A, FIG. 11A is a flow chart illustrating the control procedure of a kinetic-state transmission process carried out by the CPU 11 upon a change in the kinetic state of the smart phone 10. FIG. 11B is a flow chart illustrating the control procedure of a theft warning process carried out by the CPU 41 of the electronic watch 40 on the basis of the kinetic-state transmission process.

As illustrated in FIG. 11A, upon the start of the kinetic-state transmission process in the smart phone 10, the CPU 11 determines whether the kinetic state of the smart phone 10 has changed to the carried state or the walking state (Step S161). If the CPU 11 determines that the kinetic state is neither the carried state nor the walking state, i.e., determines that the kinetic state has changed to the stationary state (NO in Step S161), the CPU 11 ends the kinetic-state transmission process.

If the CPU 11 determines that the kinetic state has changed to the carried state or the walking state (YES in Step S161), the CPU 11 sends the updated kinetic state to the electronic watch 40 (Step S162). The CPU 11 then ends the kinetic-state transmission process.

As illustrated in FIG. 11B, upon the start of the theft warning when the electronic watch 40 receives the kinetic state, which was sent from the smart phone 10 in Step S162 in the kinetic-state transmission process, the CPU 41 determines whether the kinetic state of the electronic watch 40 is the carried state (Step S461). If the CPU 41 determines that the kinetic state is the carried state (YES in Step S461), the CPU 41 determines whether the updated kinetic state of the smart phone 10 is the walking state (Step S462).

If the CPU 41 determines that the kinetic state of the smart phone 10 is not the walking state (NO in Step S462), the CPU 41 ends the theft warning process. If the CPU 41 determines that the kinetic state is the walking state (YES in Step S462), the CPU 41 sends a control signal(s) to at least one of the display driver 52 and the drivers 57, 59, and 61 and operates at least one of the display unit 51, vibration motor 56, piezoelectric element 58, and LED 60 to issue a warning (Step S465). The CPU 41 sends a warning signal to the smart phone 10 (Step S466). The CPU 41 then ends the theft warning process.

If the CPU 41 determines that the kinetic state of the electronic watch 40 is not the carried state in Step S461 (NO in Step S461), the CPU 41 determines whether the kinetic state of the electronic watch 40 is the walking state (Step S463). If the CPU 41 determines that the kinetic state is not the walking state (NO in Step S463), the CPU 41 ends the theft warning process.

If the CPU 41 determines that the kinetic state of the electronic watch 40 is the walking state (YES in Step S463), the CPU 41 determines whether the updated kinetic state of the smart phone 10 is the carried state (Step S464). If the CPU 41 determines that the kinetic state is not the carried state (NO in Step S464), the CPU 41 ends the theft warning process.

If the CPU 41 determines that the kinetic state of the smart phone 10 is the carried state (YES in Step S464), the process of the CPU 41 goes to Step S465, and the CPU 41 issues a warning and sends warning information to the smart phone 10 (Step S466).

Figure 12A:
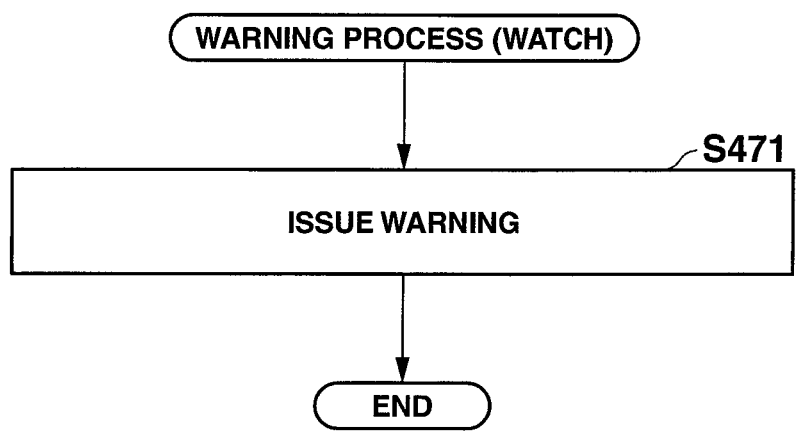
FIGS. 12A and 12B are flow charts illustrating the control procedures of warning processes associated with theft.
Figure 12B:
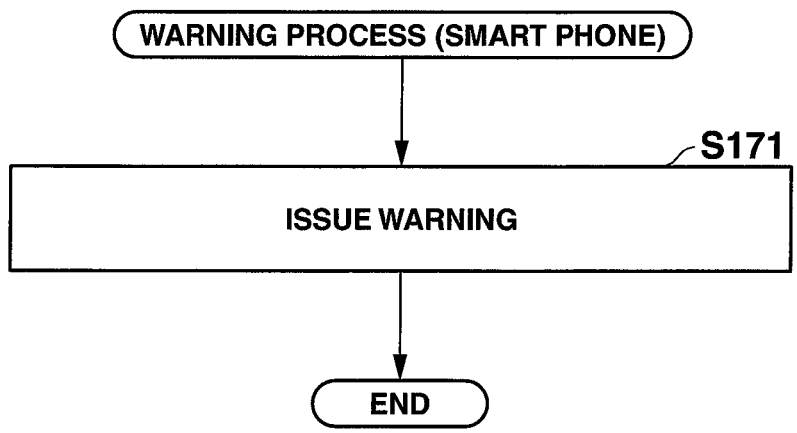

FIGS. 12A and 12B are flow charts illustrating the warning operation based on theft warning information received via the Bluetooth communication.

As illustrated in FIG. 12A, when the electronic watch 40 receives warning information from the smart phone 10, the CPU 41 issues a warning (Step S471). The content of the warning is the same as that described in Step S465, and thus redundant descriptions are omitted. The CPU 41 then ends the warning process.

As illustrated in FIG. 12B, when the smart phone 10 receives warning information from the electronic watch 40, the CPU 11 issues a warning (Step S171). The content of the warning is the same as that described in Step S155, and thus redundant descriptions are omitted. The CPU 11 then ends the warning process.

As described above, the electronic watch 40 according to this embodiment includes a Bluetooth module 53 that allows Bluetooth communication; an acceleration sensor 55; a vibration motor 56 that issues announcements; a piezoelectric element 58; and an LED 60. The CPU 41 of the electronic watch 40 makes a setting for whether to permit an announcement and/or for changing an announcement mode on the basis of the kinetic state of the electronic watch 40 determined on the basis of the data acquired by the acceleration sensor 55 and the kinetic state of the smart phone 10, an external device, acquired via the Bluetooth communication. The CPU 41 issues announcements on the basis of such a setting. Thus, necessary announcements can be issued automatically under appropriate circumstances without the operation by a user. This enables the acquisition of information necessary for the announcements while reducing the burden of the user.

A misplacement warning or a theft warning can be issued depending on the combination of the kinetic states of the electronic watch 40 and the smart phone 10 when the kinetic states are different from each other. In this way, the electronic watch 40 and the smart phone 10 can be prevented from being lost.

A misplacement warning has conventionally been issued upon the disconnection between an electronic watch and smart phone due to an increase in the distance therebetween. The time until such a warning is issued may be long if the available distance of the wireless communication signals is large, for example, due to a clear view. The electronic watch 40 and the smart phone 10 according to this embodiment prevent such time lag and readily and smoothly prevent them from being lost.

Setting conditions for issuing announcements as well as the kinetic states of the electronic watch 40 and the smart phone 10 readily allow an appropriate announcement to be issued from an appropriate device without requiring operation by a user.

The announcement of an event, such as an incoming call/e-mail to the smart phone 10, can be issued from the electronic watch 40 when the smart phone 10 is determined to be under conditions that hinder the issuing of the announcement. This enables the timely reception of important incoming calls/e-mails.

In particular, an appropriate waiting time (delay time) can be set if the electronic watch 40 and the smart phone 10 are in different kinetic states. In this way, unnecessary and excess warnings are prevented while necessary warnings are issued at appropriate timings.

A setting for whether to permit an announcement and/or for an announcement mode can be made individually for each of the conditions related to announcements. Thus, various announcements can be issued from optimal announcement units at optimal timings.

In a situation in which the user is insensible to the announcement, such as in the walking state, the output level of the announcement can be increased to ensure the perception of the announcement by the user.

The electronic watch 40's acquisition of the current kinetic state of the smart phone 10 upon a change in the kinetic state of the electronic watch 40 enables the determination of the necessity of an announcement even during an untimely disconnection from the smart phone 10.

If the electronic watch 40 and the smart phone 10 are both in the stationary state, it is determined that they are not in use. Thus, the Bluetooth communication can be disconnected to reduce power consumption. In such a case, the announcement related to an event may be issued only in the electronic watch 40 (or smart phone 10) where the event occurred. Thus, an announcement does not have to be issued in the other device, i.e., the smart phone 10 (or electronic watch 40) via the Bluetooth communication.

The Bluetooth communication may be reestablished when any one of the electronic watch 40 and the smart phone 10 ends the stationary state. Thus, the communication can be appropriately established when required.

Upon the reestablishment of the Bluetooth communication, the list of received calls/e-mails is sent to the portable electronic device that has ended the stationary state if the portable electronic device remaining in the stationary state is a communication device, such as the smart phone 10 or a mobile phone. Thus, the information on the incoming calls/e-mails can be readily acquired without the activation of the communication device.

Displaying the list of received calls/e-mails on the display unit 51 of the portable electronic device that ended the stationary state allows the other portable electronic device that remains in the stationary state to be activated only when required. This reduces the burden of the user.

An electronic watch 40 provided with a band 401 for attaching the electronic watch 40 to the user's arm enables the user to surely acquire necessary information in situations in which the user's hands are occupied and cannot hold the smart phone 10 or mobile phone, or in a formal setting in which using the smart phone 10 or mobile phone is a breach of manners.

The settings for announcement can be exchanged between multiple portable electronic devices and external devices that support the Bluetooth communication. Thus, announcements can be readily and appropriately issued to users who use multiple electronic watches 40 depending on the circumstances and/or users who use both the smart phone 10 and a mobile phone. In this way, the users can acquire necessary information at appropriate timings without making complicated settings.

An external device that instructs a portable electronic device to issue an announcement at an event, such as an incoming call/e-mail, can turn on/off the transmission of a notification of the event from the external device depending on whether the portable electronic device permits announcements. Thus, data that is not used for the announcement is not transmitted.

The loading of programs associated with the control of the announcement to a portable electronic device selected by the user enables flexible control of announcements between the portable electronic device and external device.

The present invention is not limited to the embodiments described above and various modifications are possible within the scope of the invention.

For example, the kinetic states are divided into three states: the walking state, the carried state, and the stationary state in the embodiments described above. Instead of these, the kinetic states may be divided in a different way. Alternatively, the kinetic states may be divided into more than three states.

An electronic watch is described in the embodiments above. Alternatively, other watches, such as a pocket watch, may be employed. The communication system 1 according to the present invention is not limited to the combination of an electronic watch 40 and a smart phone 10. Alternatively, a pair of smart phones 10, a combination of a smart phone 10 and a mobile phone, or a combination or pair of other personal digital assistants (PDAs) and tablets may be employed. An appropriate combination among these devices enables, for example, the management of information on incoming calls/e-mails with a single smart phone 10 or mobile phone.

In the embodiments described above, a communication system 1 establishes communication between two devices, i.e., a portable electronic device and an external device, via a Bluetooth scheme. Alternatively, the communication system 1 may establish the communication among three or more devices.

In the embodiments described above, near field communication is established through the Bluetooth scheme. Alternatively, information may be exchanged through any other scheme, such as optical communication, infrared communication, or ultrawide band (UWB) communication depending on the situation.

In the embodiments described above, the vibration strength of the vibration motor is increased upon entering the walking state, which is an example of the change in announcement mode based on the kinetic state. The embodiments, however, are not limited to such a change in announcement mode. For example, announcements in a normal state may be issued only through vibration generated by a vibration motor, whereas announcements in the walking state may be issued through both vibration and an audio output, through an audio output with an increased volume, through a display with higher brightness and contrast, and/or through a display of larger characters/graphics. In contrast to an increase in the output level in the walking state, the output level in the walking state and the carried state may be defined as the normal output level and the output level may be reduced in the stationary state.

In the embodiments described above, an acceleration sensor is used to determine the kinetic state. Alternatively, a combination of other measuring devices, such as a gyro sensor and a direction sensor, may be used.

In the embodiments described above, the configuration for issuing an announcement includes a display unit or a screen of a display operating unit, a vibration motor, a piezoelectric element, an LED, and a speaker. Other components, such as a miniature bulb, may be included.

In the embodiments described above, the reception of an incoming call/e-mail is described as an even that occurs in the smart phone 10 and is announced with the electronic watch 40. The event to be announced, however, is not limited to this. An announcement may be issued at a specific time set in the smart phone 10, after a predetermined time set by a timer, or upon detection of a specific movement or circumstance based on values acquired by measurement sensors provided for the smart phone 10.

In the embodiments described above, the storage unit 14 including the ROM 42 and a non-volatile memory is provided as a computer-readable medium for storing a program according to the present invention. The medium, however, is not limited to these. Other computer readable media may include portable recording media, such as CD-ROMs and USB memories. Carrier waves are also used as media for providing program data according to the present invention via communication lines.

The detailed structures, numerical values, and control procedures of the detailed configurations described in the embodiments may be modified appropriately within the scope of the invention.

The entire disclosure of Japanese Patent Application No. 2012-274785 filed on Dec. 17, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A portable electronic device comprising:
a wireless communication unit that transmits and receives data to and from an external device via near field communication;
a measuring unit that measures a physical quantity for determining a predetermined kinetic state of the portable electronic device;
an announcement unit that issues a predetermined announcement;
an announcement setting unit that makes a setting for whether to permit the announcement and/or for an announcement mode based on the kinetic state of the portable electronic device and a kinetic state of the external device, the kinetic state of the portable electronic device being determined based on the measurement by the measuring unit, and the kinetic state of the external device being acquired via the wireless communication unit; and
an announcement controller that controls the announcement unit to issue the announcement based on the setting made by the announcement setting unit,
wherein the announcement setting unit permits the announcement by the announcement unit when the kinetic state of the external device differs from the kinetic state of the portable electronic device.

2. The portable electronic device according to claim 1, further comprising an operation-condition determining unit that determines whether a predetermined condition for issuing the announcement is satisfied,
wherein the announcement controller controls the announcement unit to issue the announcement when the announcement setting unit permits the announcement and when the operation-condition determining unit determines that the predetermined condition is satisfied.

3. The portable electronic device according to claim 2, wherein the predetermined condition comprises a plurality of conditions and the announcement setting unit makes the setting for each of the plurality of conditions individually.

4. The portable electronic device according to claim 2, wherein the predetermined condition includes reception of information representing occurrence of a predetermined event from the external device, the event occurring in the external device.

5. The portable electronic device according to claim 3, wherein the predetermined condition includes reception of information representing occurrence of a predetermined event from the external device, the event occurring in the external device.

6. The portable electronic device according to claim 1, wherein the announcement setting unit makes the setting for changing an output level of the announcement by the announcement unit.

7. The portable electronic device according to claim 2, wherein the announcement setting unit makes the setting for changing an output level of the announcement by the announcement unit.

8. The portable electronic device according to claim 1, wherein, when the kinetic state of the portable electronic device changes, the announcement setting unit requests transmission of information associated with a current kinetic state of the external device from the external device and updates the setting associated with the announcement based on the acquired current kinetic state of the external device and the kinetic state of the portable electronic device.

9. The portable electronic device according to claim 2, wherein, when the kinetic state of the portable electronic device changes, the announcement setting unit requests transmission of information associated with a current kinetic state of the external device from the external device and updates the setting associated with the announcement based on the acquired current kinetic state of the external device and the kinetic state of the portable electronic device.

10. The portable electronic device according to claim 2, further comprising:
a communication disconnecting unit that disconnects communication between the external device and the wireless communication unit when the kinetic state of the external device and the kinetic state of the portable electronic device are both a stationary state; and
a communication restarting unit that reestablishes the communication when the portable electronic device ends the stationary state during disconnection of the communication.

11. The portable electronic device according to claim 1, further comprising an attachment portion for attaching the portable electronic device on an arm of a user.

12. A communication system comprising:
the portable electronic device according to claim 1; and
the external device, the communication system making a setting for and controlling the announcement in each of the portable electronic device and the external device based on the kinetic state of the portable electronic device and the kinetic state of the external device transmitted and received between the portable electronic device and the external device via the near field communication.

13. The communication system according to claim 12, wherein the external device comprises:
an external communication unit that transmits and receives audio data of an incoming call and/or data of an e-mail;
a transmission determining unit that determines whether information representing permission of an announcement of an incoming call and/or e-mail has been received from the portable electronic device; and
a transmission setting unit that makes a setting for transmitting information on the incoming call and/or e-mail to the portable electronic device in response to reception of the incoming call and/or e-mail when the transmission determining unit determines that the information representing the permission has been received.

14. An announcement controlling method for a portable electronic device including a wireless communication unit that transmits and receives data to and from an external device via near field communication, a measuring unit that measures a physical quantity for determining a predetermined kinetic state of the portable electronic device, and an announcement unit that issues a predetermined announcement, the method comprising:
(a) making a setting for whether to permit the announcement and/or for an announcement mode based on the kinetic state of the portable electronic device and a kinetic state of the external device, the kinetic state of the portable electronic device being determined based on the measurement by the measuring unit, and the kinetic state of the external device being acquired via the wireless communication unit; and (b) controlling the announcement unit to issue the announcement based on the setting made by step (a), wherein the announcement unit is set to permit the announcement when the kinetic state of the external device differs from the kinetic state of the portable electronic device.

15. A non-transitory computer-readable storage medium storing a program for controlling a portable electronic device including a wireless communication unit that transmits and receives data to and from an external device via near field communication, a measuring unit that measures a physical quantity for determining a predetermined kinetic state of the portable electronic device, and an announcement unit that issues a predetermined announcement, said program controlling the portable electronic device to function as:

an announcement setting unit that makes a setting for whether to permit the announcement and/or for an announcement mode based on the kinetic state of the portable electronic device and a kinetic state of the external device, the kinetic state of the portable electronic device being determined based on the measurement by the measuring unit, the kinetic state of the external device being acquired via the wireless communication unit; and an announcement controller that controls the announcement unit to issue the announcement based on the setting made by the announcement setting unit, wherein the announcement setting unit permits the announcement by the announcement unit when the kinetic state of the external device differs from the kinetic state of the portable electronic device.

16. A portable electronic device comprising:

a wireless communication unit that transmits and receives data to and from an external device via near field communication;

a measuring unit that measures a physical quantity for determining a predetermined kinetic state of the portable electronic device;

an announcement unit that issues a predetermined announcement;

an announcement setting unit that makes a setting for whether to permit the announcement and/or for an announcement mode based on the kinetic state of the portable electronic device and a kinetic state of the external device, the kinetic state of the portable electronic device being determined based on the measurement by the measuring unit, and the kinetic state of the external device being acquired via the wireless communication unit;

an announcement controller that controls the announcement unit to issue the announcement based on the setting made by the announcement setting unit;

a communication disconnecting unit that disconnects communication between the external device and the wireless communication unit when the kinetic state of the external device and the kinetic state of the portable electronic device are both a stationary state;

a communication restarting unit that reestablishes the communication when the portable electronic device ends the stationary state during disconnection of the communication;

an operation-condition determining unit that determines whether a predetermined condition for issuing the announcement is satisfied; and a history acquiring unit that requests transmission of a history of a predetermined event occurring in the external device associated with the announcement during the disconnection of the communication and acquires the history when the communication restarting unit reestablishes the communication with the external device, wherein the announcement controller controls the announcement unit to issue the announcement i) when the announcement setting unit permits the announcement and ii) when the operation-condition determining unit determines that the predetermined condition is satisfied or when the acquired history includes the occurrence of the predetermined event.

17. The portable electronic device according to claim 16, further comprising a display unit that displays predetermined information associated with the history acquired by the history acquiring unit.

* * * * *